United States Patent [19]
Derington et al.

[11] Patent Number: 5,141,538
[45] Date of Patent: Aug. 25, 1992

[54] SCRUBBER FOR GREASE EXHAUST DUCT

[76] Inventors: Jim Derington, 1752 Misty Creek, Westlake Village, Calif. 91362; John O. Dorius, 21800 Marylee St., Woodland Hills, Calif. 91607

[21] Appl. No.: 763,726

[22] Filed: Sep. 23, 1991

[51] Int. Cl.⁵ .............................................. B01D 47/02
[52] U.S. Cl. ....................................... 55/244; 55/248; 55/249; 55/257.3; 55/DIG. 36
[58] Field of Search .................. 55/223, 229, 235, 244, 55/245, 248, 249, 255, 256, 257.3, DIG. 36

[56] References Cited

U.S. PATENT DOCUMENTS

| | | |
|---|---|---|
| 266,267 | 10/1882 | Breen . |
| 1,214,114 | 1/1917 | Andrews . |
| 1,838,511 | 12/1931 | Wilson . |
| 1,842,663 | 1/1932 | Ellis . |
| 2,015,174 | 9/1935 | Anglemyer . |
| 2,373,330 | 4/1945 | Nutting . |
| 2,379,795 | 7/1945 | Fenn . |
| 2,403,545 | 7/1946 | Nutting . |
| 2,470,345 | 5/1949 | Fenn . |
| 2,832,432 | 4/1958 | Fanton . |
| 3,335,551 | 8/1967 | Golay . |
| 3,385,032 | 5/1968 | Crabbe . |
| 3,616,744 | 11/1971 | Jensen . |
| 3,624,696 | 11/1971 | Cohen et al. . |
| 3,710,551 | 1/1973 | Sved . |
| 3,731,462 | 5/1973 | Costarella et al. . |
| 3,778,979 | 12/1973 | Friedling et al. . |
| 3,789,109 | 1/1974 | Lyon et al. . |
| 3,810,349 | 5/1974 | Rebours . |
| 3,813,856 | 6/1974 | Jensen ................... 55/DIG. 36 X |
| 3,841,062 | 10/1974 | Molitor et al. . |
| 4,011,802 | 3/1977 | Molitor et al. . |
| 4,720,291 | 1/1988 | London . |
| 4,822,385 | 4/1989 | Strege et al. . |

*Primary Examiner*—Charles Hart
*Attorney, Agent, or Firm*—Robbins, Dalgarn, Berliner & Carson

[57] ABSTRACT

A scrubber for removing contaminants from an airstream, preferably including an intake duct, a scrubbing chamber, a stilling chamber, and a filtration unit. The scrubbing chamber has a primary sump and an overhanging secondary sump. A weir gate assembly is employed with the secondary sump to form a water induction slot causing water from the secondary sump to be drawn into the airstream. A baffle arrangement causes the water entrained airstream to flow over the secondary sump and a cascade plate creates a water curtain above the secondary sump. A perforated agitation panel is also disposed over the secondary sump to break up the water droplets in the airstream into smaller droplets.

17 Claims, 2 Drawing Sheets

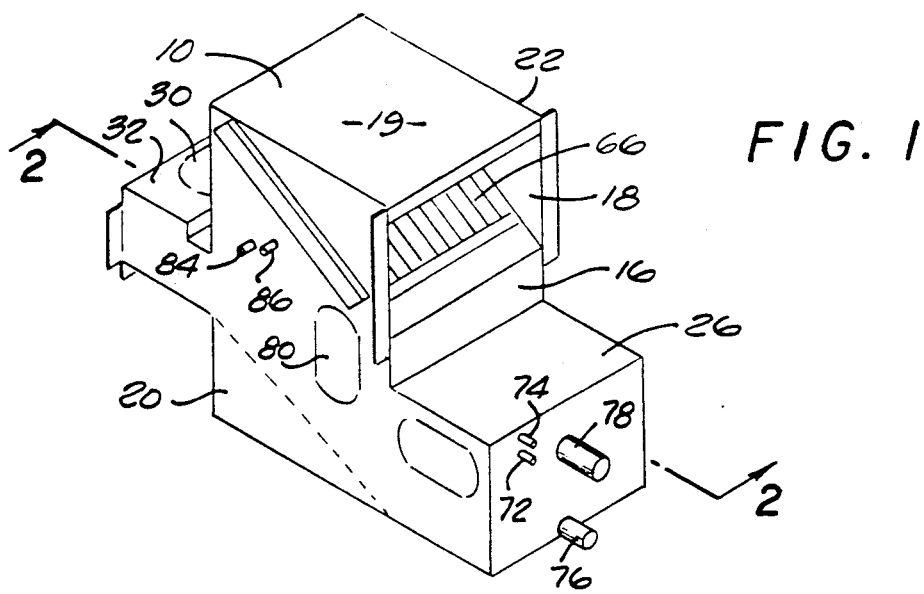

SCRUBBER FOR GREASE EXHAUST DUCT

FIELD OF THE INVENTION

This invention relates to scrubbers that remove contaminants such as grease and soot from exhaust air and, in particular, to scrubbers that utilize water reservoirs and baffle plates to wash contaminants out of a stream of exhaust air.

BACKGROUND OF THE INVENTION

In the restaurant industry specifically and others generally, there is a need to clean contaminants from exhaust air generated by cooking or other processes prior to discharging the air to the atmosphere. Recent solutions for removing contaminants include high cost and frequently undependable electrostatic precipitators, energy consuming turbo-charged afterburners and large multi-station spray nozzle and baffle plate water scrubbers. The spray nozzle, baffle plate scrubber is generally the most economical of the three types, however, it has additional problems with inconsistent water flow caused by the clogging of spray nozzles by solids in the water; most types that depend on baffle plates have high air side pressure drops which like the pump systems for the spray nozzles require high energy consumption.

Examples of scrubber systems utilizing spray nozzles include U.S. Pat. No. 3,616,744 (Jensen) which describes an air cleaning system for cooking ranges that is adapted to remove heat and contaminants such as grease laden fumes. A stream of contaminant-laden air is drawn into an exhaust duct by an exhaust fan and cleansed by the washing action of minute water droplets from a fogging spray. The droplets absorb the contaminants and fall out into a water bath. Also, vaporization of the droplets cools the stream of exhaust air causing condensation of contaminants. Other systems utilizing spray nozzles are described in U.S. Pat. No. 3,624,696 (Cohen) and U.S. Pat. No. 3,731,462 (Costarella).

An older known method of purifying exhaust air consists of directing the airstream over a water reservoir causing water to be entrained in the airstream, then utilizing upstream baffles to cause the airstream to flow in a sinuous path causing the air and water to mix. In U.S. Pat. No. 266,267 (Breen), an air purifier is illustrated that directs an airstream against a surface of water at an angle so as to spray the water. Partitions are arranged in the subsequent path of the airstream so as to catch the water particles and drip them across the air passage. In U.S. Pat. Nos. 2,373,330 (Nutting) and 2,403,545 (Nutting), an air cleaner is disclosed having a water bath and an arrangement of baffles above the bath forming a sinuous path for the exhaust airstream. The exhaust air is intensively centrifuged and a substantially continuous stream of liquid from the bath is air-propelled along the sinuous path. With an S-shaped path, the air is twice centrifuged, twice scrubbed against a film of water and twice forced to pass through a curtain of water with the result that airborne particles are wetted and drop out of the exhaust airstream.

Other systems arrange the baffles in such a way that the incoming airstream is wetted both from above and below. For example, U.S. Pat. Nos. 2,379,795 (Fenn) and 2,470,345 (Fenn) disclose an exhaust airstream that is wetted by liquid in a reservoir area and is also wetted by liquid dripping from a baffle. A similar system is disclosed in U.S. Pat. No. 3,778,979 (Friedling) wherein the baffle above the incoming airstream has a gap that allows water-laden gas to be induced by venturi effect into the upper zone of the airstream passageway.

Other baffle systems utilize secondary sumps for collecting water entrained in the airstream. In U.S. Pat. No. 4,720,291 (London), a system is disclosed wherein water from the secondary sump is used to prewash the incoming airstream. U.S. Pat. No. 2,015,174 (Anglemyer) and U.S. Pat. No. 3,810,349 (Rebours) also illustrate secondary sumps that collect liquid dripping off the baffles and return the liquid to the primary sump or evacuate the liquid from the system.

The use of such sump and baffle systems may not always result in a sufficiently thorough mixing of contaminant-laden air and water. For example, portions of the airstream may totally bypass the water reservoir. Alternatively, water curtains created by inclined baffles may only develop intermittently or not along the full width of the scrubbing chamber allowing air to pass by the curtain area without contacting water. Because increased air/water contact results in better scrubbing action, it is of utmost importance that as much of the contaminant-laden air as possible come into contact with water.

SUMMARY OF THE INVENTION

The present invention is an improved scrubbing apparatus that significantly increases the amount of cleansing water that comes into contact with exhaust air. The apparatus includes a primary sump, an overhanging secondary sump that utilizes a weir gate assembly, a perforated agitation panel and a cascade plate.

A stream of contaminant-laden exhaust air is drawn into the scrubber and passes between a water-filled primary sump and an overhanging secondary sump. The air passageway above the water surface of the primary sump is constricted to increase the velocity of the exhaust air and cause the water in the primary sump to be agitated and entrained into the airstream. The exhaust air with its agitated airborne water is next diverted by a baffle to a mixing chamber above the secondary sump which collects the water fallout. A perforated agitation panel may be used to intercept the stream of exhaust air above the secondary sump and break up the airborne water into smaller droplets to increase the surface area of water for contact with the exhaust air. A cascade plate may also be employed to direct the airborne water across the path of the stream of exhaust air and into the secondary sump.

The weir gate assembly includes an upwardly extending portion of the secondary sump and a weir plate that is spaced from and substantially parallel to the upwardly extending portion to form a slot through which water from the secondary sump is drawn into the airstream. The dimensions of the slot are such that the stream of exhaust air flowing past the slot will create a vacuum and cause water to be pulled out of the secondary sump through the slot. Preferably, the slot is near the constricted area of the air passageway above the primary sump, thus insuring that the high velocity air going by will come into contact with water from both the slot above and the primary sump below. This infusion of water into the upper and lower boundaries of the airstream insures a complete mixture of air and water.

Some of the water in the airstream will evaporate and the air will cool adiabatically. This cooling process in turn condenses any grease vapor in the exhaust air, changing it to a liquid or solid. In this new non-vapor state, the grease may then be washed out of the exhaust air by the water agitating around and through it.

The water that evaporates and the water that is suspended in the air may be compensated for by makeup water from a stilling chamber that feeds the primary sump. The stilling chamber insures that a consistent water level is maintained in the primary sump area.

Preferably, after the grease, ash and larger particles have been stripped from the exhaust air by the cooling and scrubbing process, the air next travels through an eliminator station where residual airborne water is impinged on baffles and removed from the air. Now that the exhaust air is free of grease, water and larger particles, it is capable of going through a filtration stage without clogging the filter media. In this stage, the air is further stripped of fumes, smoke and particles down to ½ micron in size.

The final stage is the fan which discharges the comparatively clean air to the atmosphere. The contaminants in solution in the water may be disposed of on a regular basis in a manner prescribed by code.

Compared to the more advanced modern scrubbers, the apparatus described herein is easy to maintain in that it has no moving parts or complex electronics. It is also easily cleaned by simply running an agitation cycle with soapy water. Access panels may also be used to provide entry to all areas inside the scrubber.

BRIEF DESCRIPTION OF THE DRAWINGS

FIG. 1 is an isometric view of a preferred embodiment of the present invention.

FIG. 2 is a cross sectional elevational view of the apparatus shown in FIG. 1, taken along line 2—2, with an attached filtration unit.

DETAILED DESCRIPTION

Figure 3:
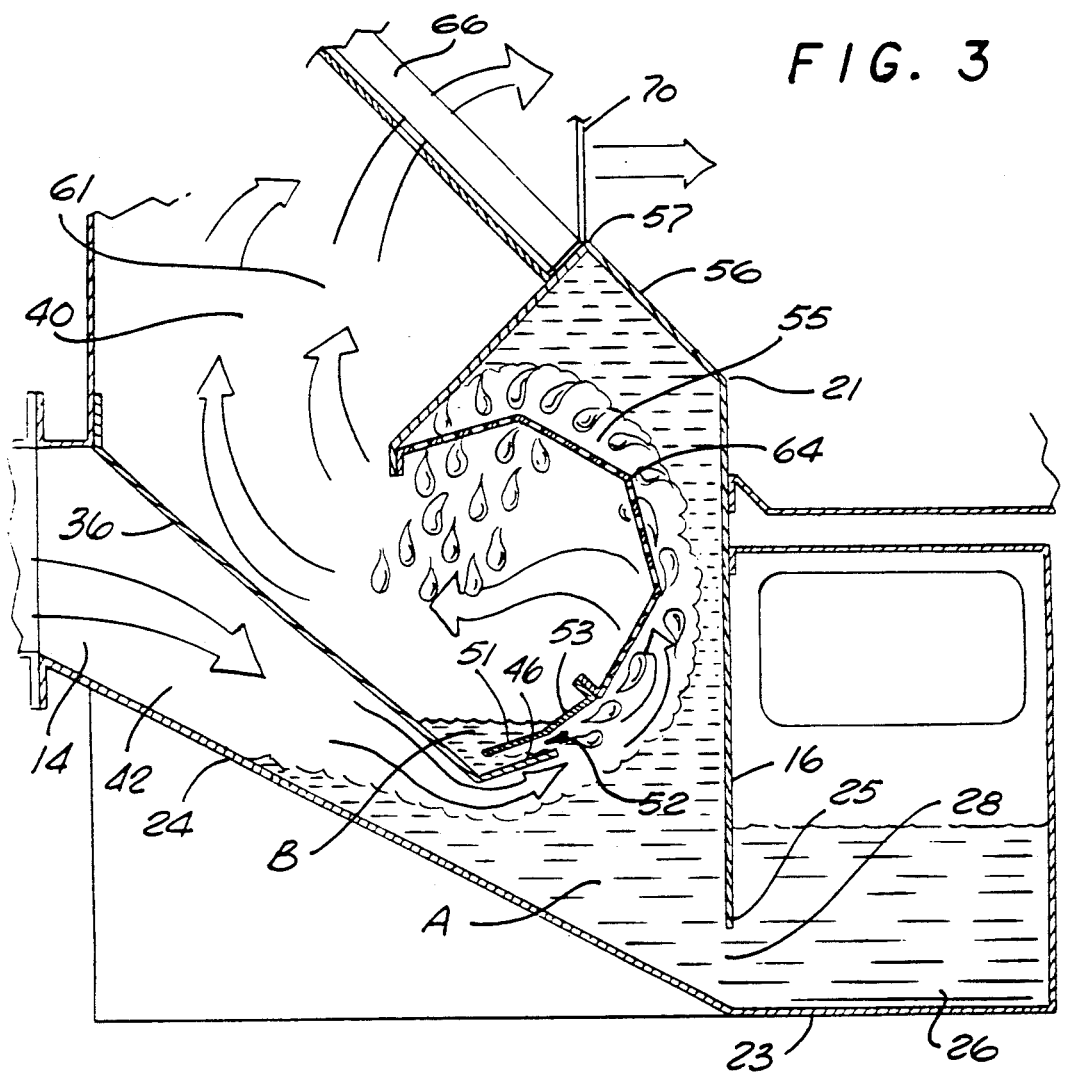
FIG. 3 is a fragmentary enlarged view of the scrubbing chamber and stilling chamber during operation.

While the invention will be exemplified by reference to a detailed illustrative embodiment, the invention in general and certain aspects in particular, are broad in scope, for example, the use of a secondary sump having a weir portion for inducing water into the contaminant-laden airstream and/or a perforated agitation panel. Consequently, the specific structural and functional details disclosed herein are merely representative and are deemed to afford the best embodiment known at this time to provide a basis for the claims which define the scope of the present invention.

A scrubber embodying the features of the present invention is shown in FIGS. 1 and 2. The scrubber includes a scrubbing chamber 10, a stilling chamber 26, an intake duct 32 and a filtration unit 34. The scrubber is preferably constructed from 16 gauge stainless steel.

The scrubbing chamber 10 includes an inlet wall 12 defining an air inflow port 14, a front wall 20, a back wall 22, a slant bottom floor 24 and ceiling 19. A vertically oriented baffle plate 16 that extends between the front wall 20 and the back wall 22 forms another wall of the scrubbing chamber 10 opposite the inlet wall 12. The baffle plate 16 separates the scrubbing chamber 10 from the stilling chamber 26. A top edge 21 of the baffle plate 16 is separated from the ceiling 19 to define an air outflow port 18 for the scrubbing chamber 10.

The slant bottom floor 24 of the scrubbing chamber 10 extends downwardly from the bottom of the air inflow port 14 to a location just below a bottom edge 25 of the baffle plate 16 and then extends horizontally past the baffle plate 16 to form a flat bottom floor 23 for the stilling chamber 26. The slant bottom floor 24 and the baffle plate 16 form a primary sump A (see FIG. 3) that is fed with water by the stilling chamber 26 through an opening 28 between the bottom edge 25 of the baffle plate 16 and the floors 23, 24 of the stilling chamber 26 and the scrubbing chamber 10, respectively.

The stilling chamber 26 is filled with water through a pipe connection 72 (see FIG. 1) to a predetermined level. A standard water level control 74 is provided to electronically gauge and maintain the water level. Accordingly, the stilling chamber both feeds water to the primary sump A through the opening 28 and compensates for any water in suspension in the system during operation through control 74. A drain pipe connection 76 and an overflow pipe connection 78 are also provided in the stilling chamber 26.

The intake duct 32 is secured by welding or otherwise to the inlet wall 12 of the scrubbing chamber 10 at the air inflow port 14. In the usual situation, the intake duct 32 of the scrubber is directly connected to the hood of a cooking station (not shown). An access panel 30 may also be provided at the top of the intake duct 32 to permit entry for maintenance.

The filtration unit 34 may be connected to the scrubbing chamber 10 at the air outflow port 18. Any suitable filter may be used depending on the type, size and quantity of the contaminants in the airstream at this portion of the scrubber. In the preferred embodiment, a fiberglass filter with 95% efficiency is used for removing smoke, fumes and particles down to ½ micron. For example, a Farr 3P glide pack having a 30/30 prefilter and a Riga-Flo 200 final filter may be used. The filters are placed in series for maximum filtration. Suitable ductwork (not shown) may then be secured to the filtration unit and extended to an exhaust fan (not shown) for discharging clean exhaust air to the atmosphere.

Inside the scrubbing chamber 10, and extending between the front wall 20 and back wall 22, is an air chamber divider 36 that divides the casing into an upper chamber 40 and a lower chamber 42. The divider 36 has a first portion 38 that is secured to the inlet wall 12 of the casing just above the air inflow port 14 and extends downwardly and inwardly terminating in a distal edge 44. A second portion 46 of the divider extends from the distal edge 44 upwardly and terminates in an outer edge 45 prior to contacting the baffle plate 16 forming a chamber passageway 48 between the outer edge 45 and the baffle plate 16.

The first portion 38 and second portion 46 of the divider also form a secondary sump B (see FIG. 3) that is disposed above the primary sump A. The second portion 46 of the divider cooperates with a weir plate 50 to form a weir gate assembly 49. The weir plate 50 has a first part 51 disposed substantially parallel to and slightly above the second portion 46 of the divider forming a water induction slot 52 between the weir plate 50 and the second portion 46 of the divider. A second part 53 of the weir plate 50 extends upwardly from the first part 51 to raise the water level in the secondary sump B and to help ensure that sufficient water will be available to flow through the water induction slot 52.

The scrubbing chamber also includes a counterflow plate 56 which extends upwardly and into the scrubbing chamber 10 from the top edge 21 of the baffle plate 16. Secured to an inward end 57 of the counterflow plate 56 is a downwardly extending cascade plate 58 having a lip 60 for directing water that impinges the cascade plate to the secondary sump below. The counterflow plate 56 and the cascade plate 58 form the upper boundary of a mixing chamber 55 (see FIG. 3) above the secondary sump.

Extending between the second part 53 of the weir plate 50 and the lip 60 of the cascade plate 58 is a perforated agitation panel 64. Preferably, the agitation panel 64 has an arcuate or angular shape that approximates the airflow pattern through the mixing chamber 55. Such a shape will form a concave-like surface facing into the secondary sump B. The perforations of the agitation panel 64 have a suitable diameter, e.g., 3/16 inch, to ensure that water entrained in the airstream will be broken into smaller droplets. This creates a greater water surface to air ratio which enhances the cleansing action. An access panel 54 may be provided in the inlet wall 12 to permit removal of the agitation panel 64 for cleaning.

Figure 4:
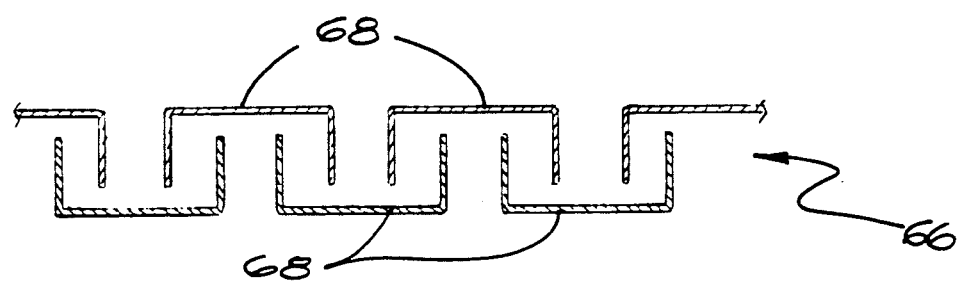
FIG. 4 is a cross sectional view of the water eliminator shown in FIG. 2, taken along line 4—4.

A water eliminator 66 is also utilized to remove additional water from the stream of exhaust air prior to filtration. Any known eliminator providing a sinuous path for air flow may be utilized. In the preferred embodiment, the eliminator 66 is secured at an angle to the inlet wall 12 of the scrubbing chamber 10 near the ceiling 19 and to a top portion of the cascade plate 58. Referring to FIG. 4, a channel type eliminator 66 is depicted wherein individual channels 68 are placed in opposed relationship. Airborne water droplets in the airstream entering the eliminator 66 impact against the channel members and drip downwardly toward the cascade plate, then along the top of the cascade plate and ultimately into the secondary sump B. A catchplate 70 may also be secured adjacent the outlet side of the eliminator and extending upwardly to help prevent residual moisture that passes through the eliminator 64 from entering the filtration unit 34.

In operation, the primary sump A is filled to a predetermined level with water and an exhaust fan is activated. A stream of exhaust air from a cooking station below is drawn through the intake duct 32 and the inflow port 14 into the lower chamber 42 of the scrubber. As the airstream flows through the lower chamber, it gains velocity due to the gradually constricting passageway between the divider 36 and the water in the primary sump A. If the water level is properly set, the high velocity airstream will cause the water in the primary sump to be agitated and entrained into the airstream. Next, as the water-entrained airstream enters the upper chamber 40, it is forced by the baffle plate 16 and counterflow plate 56 to abruptly reverse direction causing a turbulent action of water and air in the mixing chamber 55. The perforated agitation panel 64 further agitates the airstream and breaks the water into smaller droplets. Finally, the water-entrained airstream strikes the cascade plate 58 which creates a water curtain off of lip 60 across the path of the airstream.

The falling water is collected in the secondary sump B and is subsequently drawn out of the water induction slot 52 into the airstream to further enhance air-to-water contact. Placing the weir plate 50 at an appropriate distance above the second portion 46 of the divider, significantly increases the amount of water drawn out of the slot due to the vacuum condition created by the high velocity airstream flowing past the slot. It is noted that at or adjacent the location of the slot, water is simultaneously drawn into the upper portion of the airstream from the secondary sump and also into the lower portion of the airstream from the primary sump. The combined action in the mixing chamber of the baffle plate and counterflow plate causing reversal of the airstream, the sumps causing water entrainment, the perforated agitation panel further breaking up the water droplets and the cascade plate creating a water curtain, causes substantially all of the contaminants to be thoroughly scrubbed and washed out of the airstream.

After passing through the mixing chamber 55, the stream of exhaust air flows into a lower velocity area 61 of the upper chamber 40 where water droplets continue to fall out of, and counterflow to, the airstream. The lower velocity area 61 is simply a larger volume area of the upper chamber where the airstream expands and slows down. Additional water is extracted from the air in the water eliminator 66 just prior to filtration and the clean exhaust air is then filtered and discharged to the atmosphere.

A large observation port 80 may be inserted in the front wall 20 at or around the water induction slot 52 to permit inspection of the scrubber in operation to assure that proper agitation of air and water is occurring. Suitable water entrainment from the slot and the primary sump may also be confirmed. Mixing of air and water is maximized when a steady flow of water from the induction slot 52 occurs along the full width of the secondary sump (i.e., from the front wall 20 to the back wall 22) and when a steady water curtain from the cascade plate 58 is formed above the secondary sump B. The observation port 80 may also be incorporated into an access panel to permit entry for maintenance. A similar observation port/access panel may be installed in the stilling chamber 26.

The scrubbing chamber 10 may also be provided with a hot water connection 84, spray nozzles (not shown) and a detergent line 86 directed into the upper chamber 40 to permit cleaning of the scrubbing chamber on a periodic basis. For example, after the scrubber has been in operation for a significant period of time, the fan can be deactivated and the scrubbing chamber purged of greasy water and rinsed by opening the drain pipe in the stilling chamber and spraying hot water and detergent inside the scrubbing chamber. Next, the system is further cleansed by closing the drain pipe, filling the primary sump with hot water and detergent and then activating the fan for a short period of time to agitate the detergent and water throughout the scrubbing chamber. Finally, the scrubbing chamber is rinsed and flushed. During normal operation, greasy water may also be occasionally flushed by opening the drain pipe, then refilling through the pipe connection 72.

The scrubber described above may be used to treat varying quantities of exhaust air. A standard scrubbing unit may be used with only the width of the unit (i.e., the distance from the front wall 20 to the back wall 22) varying to accommodate differing air flows. For example, the scrubbing chamber for a preferred standard unit may have a height of approximately four feet, a length (from the inlet wall 12 to the baffle plate 16) of about two feet, an inflow port height of eight inches and a water level in the stilling chamber of approximately six inches. Then, for air quantities as low as 1,000 cubic feet per minute, a scrubber having a width of approximately 21 inches may be used. For air quantities as high as approximately 3,000 cfm, a scrubber having a width of approximately 48 inches may be used. For air quantities less than approximately 1,000 cfm, additional baffles may be added to the lower chamber to restrict the width of the air passageway to maintain proper agitation. For air quantities more than approximately 3,000 cfm, multiple scrubbing units may be used in parallel.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A scrubber for removing contaminants from an airstream, said scrubber comprising:
   a scrubbing chamber having an inflow port and an outflow port for the airstream to flow into and out of the scrubbing chamber, said scrubbing chamber also having a floor and walls that define a primary sump for containing a first body of water at a predetermined level;
   a baffle secured to said scrubbing chamber extending upwardly above said predetermined level, said primary sump disposed between said baffle and said inflow port;
   a divider mounted inside said scrubbing chamber to divide the scrubbing chamber into an upper chamber and a lower chamber, said inflow port and primary sump disposed in the lower chamber and said outflow port disposed in the upper chamber;
   said divider having an outer edge spaced from said baffle to form a chamber passageway therebetween and having a surface facing the lower chamber that defines a boundary of a passageway for the airstream to flow from the intake port to the chamber passageway;
   said divider having associated walls to define a secondary sump above said primary sump for containing a second body of water, said secondary sump disposed adjacent said chamber passageway and having an outlet into the passageway defined by the outer edge of the divider; and
   a counterflow portion of said baffle directed inwardly into said upper chamber and disposed above said secondary sump for directing the airstream over the secondary sump.

2. The scrubber of claim 1 wherein said counterflow portion of said baffle extends inward directly above said secondary sump and wherein said scrubber further comprises a perforated panel extending between said divider adjacent said outer edge thereof and said counterflow portion adjacent an inward end thereof such that the perforated panel is directly above the secondary sump.

3. The scrubber of claim 2 wherein the perforated panel has a concave-like surface facing into the secondary sump.

4. The scrubber of claim 1 further comprising a weir gate assembly which includes a weir plate and a portion of the divider that includes the outer edge of the divider, said weir plate being spaced closely above said portion of the divider to define a water induction slot between the weir plate and said portion such that the airstream flowing past the slot will create a vacuum in the slot causing water to be drawn from the secondary sump into the airstream.

5. The scrubber of claim 4 further comprising a perforated panel extending between said weir plate and said counterflow portion of said baffle such that the perforated panel is directly above the secondary sump.

6. The scrubber of claim 5 wherein the perforated plate has a concave-like surface facing into the secondary sump.

7. The scrubber of claim 6 wherein the concave-like surface of the perforated panel is formed by angled portions of said perforated panel.

8. The scrubber of claim 4 wherein said baffle, including the counterflow portion of said baffle, comprises a vertically oriented baffle plate having an upper edge and a lower edge, a counterflow plate secured to said upper edge of said baffle plate and extending upwardly and inwardly into said scrubbing chamber above said secondary sump and a cascade plate secured to said counterflow plate and extending downwardly in said scrubbing chamber above said secondary sump.

9. The scrubber of claim 8 further comprising a stilling chamber adjacent the scrubbing chamber, said baffle plate forming a common wall for the stilling chamber and the scrubbing chamber and said bottom edge of said baffle plate spaced apart from the floor of said scrubbing chamber to permit communication of water between the scrubbing chamber and the stilling chamber.

10. The scrubber of claim 7 wherein said baffle, including the counterflow portion of said baffle, comprises a vertically oriented baffle plate having an upper edge and a lower edge, a counterflow plate secured to said upper edge of said baffle plate and extending upwardly and inwardly into said scrubbing chamber above said secondary sump and a cascade plate secured to said counterflow plate and extending downwardly in said scrubbing chamber above said secondary sump, said perforated panel extending between said weir plate and said cascade plate.

11. The scrubber of claim 4 wherein said scrubbing chamber further includes means for lowering the velocity of the airstream in the upper chamber after the airstream flows past the counterflow portion of the baffle.

12. The scrubber of claim 11 further comprising a water eliminator means disposed in the scrubbing chamber between the means for lowering the velocity of the airstream and the outflow port.

13. The scrubber of claim 12 further comprising a filtration means connected to the outflow port of the scrubbing chamber for further treatment of the airstream with filters prior to discharge of the airstream to the atmosphere.

14. The scrubber of claim 4 wherein said floor of said primary sump slants downwardly away from said inflow port.

15. The scrubber of claim 1 wherein said walls of said primary sump include a front wall and a back wall and said associated walls of said secondary sump are the front wall and back wall.

16. The scrubber of claim 1 wherein said divider is a divider plate having a first portion that extends inwardly and downwardly from a location above the inflow port toward the primary sump and a second portion secured at a lower edge of the first portion and extending upwardly terminating in said outer edge that is spaced from the baffle.

17. The scrubber of claim 16 wherein said outer edge is disposed horizontally to permit water to flow simultaneously along the full length of the outer edge.

* * * * *